INVENTOR
JOHANNES PETERMANN
By Toulmin & Toulmin
Attorneys

March 9, 1965 J. PETERMANN 3,173,134

CIRCUIT NETWORK FOR ELECTROMAGNETIC TRANSDUCER HEADS

Filed April 27, 1962 2 Sheets-Sheet 2

INVENTOR

JOHANNES PETERMANN

By Toulmin & Toulmin

Attorneys

United States Patent Office 3,173,134

Patented Mar. 9, 1965

3,173,134
CIRCUIT NETWORK FOR ELECTROMAGNETIC TRANSDUCER HEADS

Johannes Petermann, Wilhelmshaven, Germany, assignor to Olympia Werke A.G., Wilhelmshaven, Germany Filed Apr. 27, 1962, Ser. No. 190,645
Claims priority, application Germany, May 12, 1961, O 8,056
7 Claims. (Cl. 340—174.1)

Figure 1:
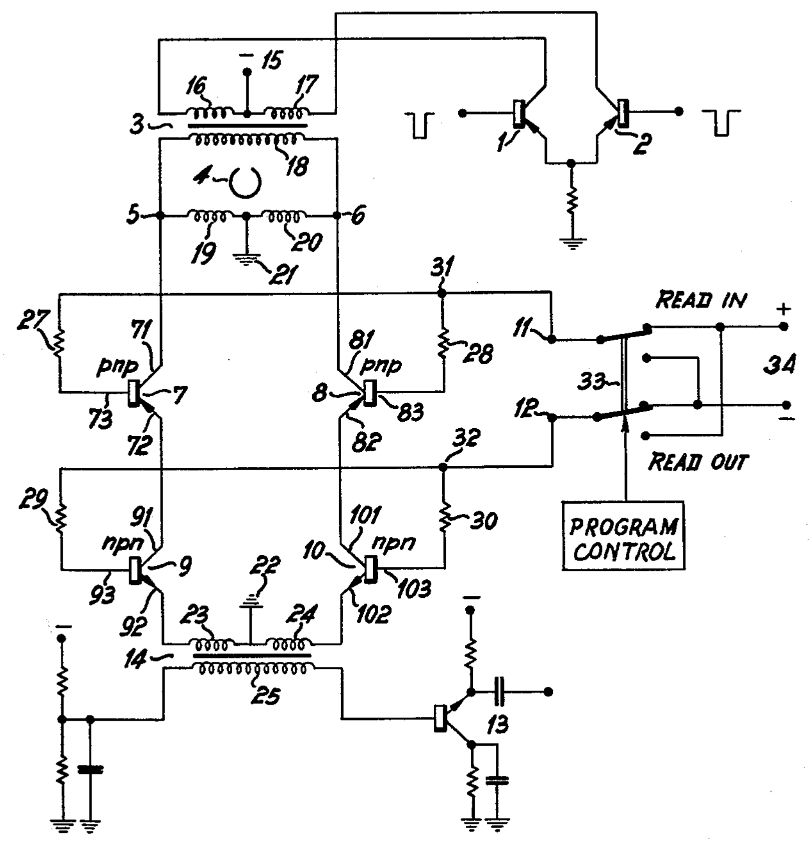

The present invention relates to a circuit network for controlling electromagnetic transducer heads, and more particularly to an enabling circuit network for rendering such transducer heads selectively operable for read-in (or recording, or writing) and for read-out (or play back). Such transducer heads are employed to handle information, mostly trains of pulses representing bit-information signals. The transducer heads cooperate with a magnetic storage medium such as the surface of a magnetizable drum, a magnetic tape, wire etc.

It is known, to use separate transducers for read-in and read-out. The corresponding read-in and read-out amplifiers may be mounted and connected separately, wherefrom results the advantage of a clear and completely decoupled arrangement. It has, however, been proven to be disadvantageous that, for example, in connection with magnetic storage drums, two magnetic recording heads always have to be adjusted individually with relation to a track. Since there is a trend towards developing storage elements handling more and more information at smaller and smaller a space, such adjustment of the two heads becomes more and more critical, and the danger of getting out of alignment is increased steadily.

Switching devices have, therefore, been developed permitting the use of the same magnetic transducer head for the purpose of selectively reading-in and reading-out the information of interest. In the case of a thus developed electronic track selection in magnetic storage drums and also in tape recorders, electric and/or magnetic coupling of read-in and read-out amplifiers cannot be avoided, especially if expensive and partly program-controlled switches are to be avoided.

The voltage peaks induced in the winding of the magnetic transducer head during the read-in process may lie between 10–30 volts, thus being higher by about three orders of magnitude than the read-out voltages which, in most cases, only reach values between 50 mv. and 100 mv. Such read-out signals must be amplified in several stages prior to their utilization.

If read-in and read-out amplifiers are coupled, there is a risk of the read-out amplifier being subjected to excessive control voltages due to the high voltage peaks occurring during read-in. Since it is customary to use R-C coupled amplifier stages, a prolonged period of time elapses after a read-in period and before the read-out amplifier is made operable again for the amplification of the low read-out voltages. This regenerating phase has a disturbing effect on the process of the transmission of data, especially if the transducer head is to be used, for example, in connection with a high speed electronic computer and if storing i.e. read-in and read-out follow each other in rapid succession.

It is therefore the primary object of the present invention to suggest a circuit network for electromagnetic transducer heads which serves as enabling device for signal storing as well as for read-out of information, in and out of magnetizable surfaces such as magnetic drums, magnetic tapes and the like, which enabling network selectively blocks the read-out amplifier from the high-voltage peaks occurring during the read-in, while read-out voltages are permitted to pass from the transducer head to the read-out amplifier practically not attenuated.

According to one aspect of the present invention in a preferred embodiment thereof, it is suggested to directly connect (parallel connection) the energizing coil or coils of a magnetic transducer head to a read-in control circuit, particularly the secondary winding of an input transformer thereof. Then there is a read-out circut having as first element a transformer which is the input transformer for the first read-out amplifier stage. The primary winding of this read-out transformer is to be connected to the transducer coil which for read-out is energized by the core of the transducer head. The last mentioned connection between read-out primary and transducer coil is not a direct one, but there is interposed at least one set of series connected complementary transistors. The salient point of the invention is to provide circuitry to avoid a direct connection between the transducer head coil and the said primary winding, capable of assuming different voltage potentials. The only direct connection permitted is that of a common grounding.

In a more particular embodiment, it is suggested to divide the transducer coil into two electrically series-connected, similar portions having the junction thereof grounded. The free branches or coil terminals of the coil portions are connected individually and respectively to two series circuit networks of complementary transistors, particularly the series connected collector-emitter paths thereof. These two networks are then interconnected by the primary winding of the read-out transformer having a grounded center tap (i.e. two series connected portions with grounded junction).

Since there are two sets or networks of complementary transistors there are naturally two pnp and two npn transistors with yet free base electrodes. Preferbaly, the base electrodes of similar type transistors are resistively interconnected and lead to a common terminal. Thus there are two terminals, and as salient inventive feature there are provided means for applying a D.C. biasing voltage across these two terminals. Depending on the polarity of this biasing voltage as applied, the transistors (all of them) will either be cut off or be conductive which means that there either is decoupling or coupling between transducer and read-out transformer. The particular connection though operating with a D.C. biasing current in case of coupling the transducer to the read-out transformer, is devised to prevent D.C. magnetization of either the transducer core or the transformer core, since the transducer coil as well as the read-out transformer primary has a grounded center tap so that the D.C. current biasing the transistors, flows symmetrically through coil and primary, and the magnetizations thereof balance respectively.

Figure 3:
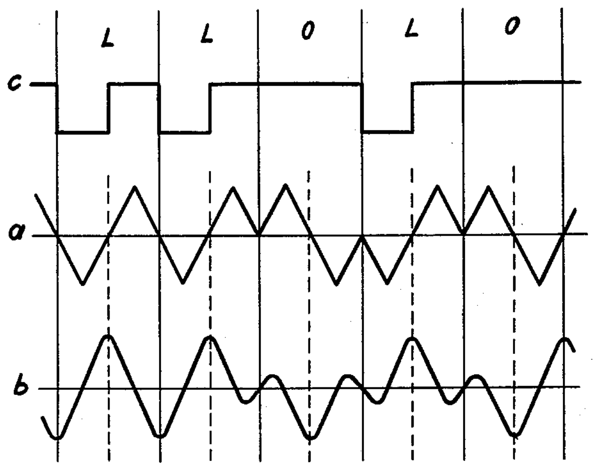
Figure 2:
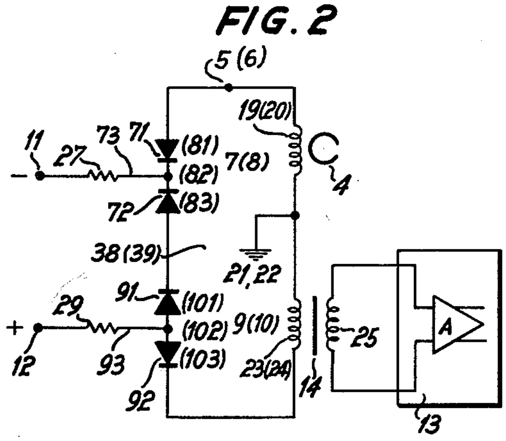

While the specification concludes with claims particularly pointing out and distinctly claiming the subject matter which is regarded as the invention, it is believed that the invention, the objects of the invention and further objects and advantages thereof will be better understood from the following description taken in connection with the accompanying drawings in which:

FIGURE 1 illustrates a circuit diagram of an embodiment of the invention, shown in read-in operating position, FIGURE 2 is the equivalent circuit of a portion of the circuit illustrated in FIGURE 1, but shown at read-out operating position, and FIGURE 3 illustrates pulse trains, voltages and currents for read-in and read-out of a particular pulse sequence of bit information.

Turning now to the detailed description of the drawings, in FIGURE 1 thereof there is first shown a magnetic transducer head 4 having a tapped control or exciter winding with similar coil portions 19 and 20; the tap is grounded at 21. Reference numerals 5 and 6 denote the outer terminals of the transducer coil.

Terminals 5 and 6 connect the transducer coil 19–20 to a secondary winding of a read-in transformer 3. Transformer 3 has a primary winding divided into two series connected similar coil portions 16 and 17 with a junction 15 connected to a negative terminal of a suitable D.C. voltage source.

The other ends or outer terminals of coil portions 16 and 17 are respectively connected to the collectors of pnp transistors 1 and 2 having interconnected emitters connected to ground via a biasing ohmic resistor. The two transistors 1 and 2 are base controlled by means of negative read-in pulses alternatingly applied, and they comprise the end-stage of an otherwise conventional read-in device (not shown in further details).

Terminals 5 and 6 are the respective end terminals of a series circuit network including, in this succession the following elements: a collector 71 of a pnp transistor 7, the collector emitter path thereof, the emitter 72 of transistor 7, the collector 91 of an npn transistor 9, the emitter-collector path thereof, the emitter 92 of transistor 9, similar coil portions 23 and 24 with grounded center tap or junction (22), and pertaining as primary winding to a read-out transformer 14; proceeding with the series circuit there is next the emitter 102 of an npn transistor 10, the collector-emitter path thereof, collector 101 of transistor 10, emitter 82 of a pnp transistor 8, the emitter-collector path thereof, and the collector 81 of transistor 8 being joined to terminal 6.

This series circuit network as described thus far in conjunction with transducer coils 19 and 20 can also be considered as two similar, actually separated networks, the first one including the following elements: ground 21, 19, 5, 71, 7, 72, 91, 9, 92, 23, ground 22. This network will later be identified further as, branch network 38.

The other one is: ground 21, 20, 6, 81, 8, 82, 101, 10, 102, 24, ground 22. This network will later be identified as branch network 39.

Looking at transducer coil 19–20 and read-out transformer primary 23–24 respectively as one element, there is no direct interconnection and connection is made through two sets of complementary transistors (7, 9 and 8, 10) separating or decoupling the potentials at terminals 5 and 6 from the read-out transformer 14. Looking, however, at individual coil portions 19, 23 and 20, 24, there is in fact a direct connection between transducer coil and transformer primary due to the grounded center taps (21 and 22). This "connection," however, is ineffective as far as coupling of transducer and read-out transformer is concerned, since such connection is of constant potential.

The series circuit network connected from terminal 5 to terminal 6, as described thus far is composed of elements having further connections not yet described.

Transistor 7 has its base electrode 73 connected via a resistor 27 to a terminal 31; the base electrode 83 of transistor 8 is likewise connected to this terminal 31 via a resistor 28. Terminal 31 is connected to a terminal 11 which is connected to the upper blade of a switch 33.

Transistor 9 has a base electrode 93 connected to a terminal 32 via a resistor 29, while base electrode 103 of transistor 10 is connected to the same terminal 32 via a resistor 30. Terminal 32 is connected to a terminal 12 which is connected to the low blade of switch 33.

Switch 33 is illustrated schematically as a mechanical switch with two linked blades. However, this switch can also be a flip-flop gating device of electronic design. Devices of this type are widely known and the equivalency of mechanical and electronic switches is apparent and well known to one skilled in the art. Reference is made to Richards, Digital Computer, Components and Circuits, Van Nostrand, 1959, and Ledly, Digital Computer and Control Engineering, McGraw-Hill, 1960.

The purpose of switching device 33 is to connect the terminals of a D.C. voltage source 34 as biasing voltage at alternating polarity to terminals 11 and 12.

The position of the blades of switch 33 are so that the upper position (illustrated) is for biasing the transistor network for "read-in," while the lower and alternative position of the two blades is for "read-out." Utilization of other switching devices is apparent since the object is to apply one particular D.C. potential to one terminal (11 or 12) to the exclusion of the other D.C. potential of sources 34 while provision is to be made to have selectively reversed the applying of the potentials.

As indicated schematically, switch 33 is program controlled from a computer so as to alternate between read-in and read-out in selected sequence. Program operated switches in computers are also known (see Ledley, supra) and no detailed description thereof is needed.

The transformer 14, the primary of which is a member of the series circuit network as connected across terminals 5, 6, has a secondary winding 25 connected to a read-out channel but only the first amplifier stage 13 thereof is illustrated. Amplifier 13 is shown as npn transistor amplifier in emitter configuration.

The other side of secondary winding 25 is connected to a voltage divider connected between ground and a negative voltage potential terminal, for appropriately biasing the transistor 13.

*Read-out* shall be discussed first.

Proceeding now to FIGURE 2, there is illustrated the diode-equivalent circuit of branch network 38, referred to and identified by its elements above and including coil 19, transistors 7 and 9, and coil 23. Since the other branch network 39 is similar, FIGURE 2 can also be construed as illustrating this other branch network 39; this is signified by adding the reference numerals in brackets aside of the corresponding elements.

Terminals 11 and 12 are illustrated in FIGURE 2 as being connected for "read-out" which as compared with the operating position shown in FIGURE 1 is the alternative position of switch 33 thereof.

For this particular operating position of FIGURE 2, i.e. for read-out, the state of conduction and blocking of the several elements is to be considered; the diode-equivalent representation of the several transistors facilitates the orientation (see for example, Henney, Radio Engineering Handbook, 1959, chapter 10).

The particular connection illustrated in FIGURE 2 shows all transistors (i.e. transistors 7, 8, 9, and 10) conductive which actually means that all of the transistors exhibit a low emitter-collector-path resistivity thus coupling coils 19 and 20 to coils 23 and 24, respectively. Accordingly, the signal pick-up produced by and in transducer 4 can readily be detected by the input circuit of read-out amplifier 13. The low ohmic resistivity of this coupling circuit is achieved by a D.C. biasing current supplied to and through the transistors 7 to 10. Of course, this results in residual D.C. currents through the two branches 38 and 39 of this entire network. However, these D.C. currents are of similar magnitude and flow in opposite direction through coils 19 and 20, and also through coils 23 and 24 in opposite direction. Thus, there is no D.C. magnetization of transducer 4 and of transformer 14 since the magnetizing effect of the two D.C. currents balance in the cores of transducer 4 and transformer 14, respectively. This is an important provision, since upon altering the operating position of switch 33, no voltage is induced in secondary winding 25 by virtue of a downward or upward sloping of the residual D.C. current. Likewise, the transducer 4 is not caused to "write back" a pulse into the storage element during this switch over.

Proceeding now with the conditions as they appear during *read-in*.

In case switch 33 has the operating position illustrated in FIG. 1, the circuit is readied for read-in (or recording, or writing). This results, taking again the equivalent circuit of FIGURE 2, in an exchange of the positions of the symbols + and — therein, so that now at terminal 11 there is a positive biasing voltage potential, and at terminal 12 there is a negative one. Accordingly, the base electrodes (73, 83) of transistors 7 and 8 are biased to transistor cut off. If the momentary potential appearing at terminal 5 (or 6) is negative by virtue of the read-in operation, the collecor-base path of transistor 7 (or 8) is still cut off, no emitter current can flow and no change in voltage potential then appears at transistor 9 (or 10) the base electrode of which being negatively biased for cut-off anyway.

In case the potential at terminal 5 (or 6) is a positive one exceeding that of the base bias of transistor 7 (or 8), then the collector-base path of this transistor 7 (or 8) is opened for conduction, and the positive potential is applied to collector 91 (or 101) of transistor 9 (or 10). Since transistor 9 (or 10) is of the npn type, the base-emitter path thereof is biased even more towards cut-off, so that the positive potential at terminal 5 (or 6) is not transferred to transformer 14.

Looking at the circuit enabling circuit as defined between transducer and read-out channel as a whole, a voltage applied during read-in across transducer coil 19–20 rendering terminal 5 positive and terminal 6 negative is blocked off transformer 14 by transistors 8 and 9, while a reversely poled voltage across coils 19 and 20 is blocked off transformer 14 by transistors 7 and 10. Accordingly, whatever voltage appears at terminals 5 and 6 at whatever polarity, in the illustrated operating position of switch 33 (FIGURE 1), such read-in voltage is not transferred upon read-out transformer 14 and thus kept from read-out amplifier 13.

In case of read-in, the voltages appearing at terminals 5 and 6 are thus reduced in size by the transistors down to a level, where they cannot affect transistor 13 anymore. Consequently, when switch 33 is now changed to the read-out position, amplifier 13 is immediately ready for operation and no delaying bias shift etc. occurs.

The complete operation of the circuit shall be explained in connection with FIGURE 3.

FIGURE 3*c* illustrates bit information as pulse trains L L O L O which can be construed as binary code for decimal-numeral "twenty six."

Upon read-in, negative pulses (FIGURE 3*c*) are alternatingly applied to the two transistors 1 and 2, and a current as illustrated in FIGURE 3*a* flows through transducer exciter coil 19–20; actually, the current flows alternatingly through one of the coil portions (19 or 20) to ground (terminal 21). The corresponding voltage potentials at terminals 5 and 6 are blocked off the read-out transformer 14 by means of the transistors 7 to 10 in a manner described above. Transducer 4 now writes the pulses into a magnetic storage device such as a tape, a drum, a plate or the like.

Upon placing the switch 33 into the "read-out" position, it may be assumed that the stored record of the pulse train L L O L O be read back; now the voltage appearing across terminals 5 and 6 is that illustrated in FIGURE 3*b*. The maximum amplitude thereof may vary between ±50 mv. and ±100 mv. The biasing source 34 now renders all of the transistors 7 to 10 conductive and thus enables coupling of the transducer to the read-out channel. Accordingly, transistors 7 to 10 are low ohmic as far as their respective collector-emitter paths are concerned, so that the current in coil 19–20 can be transmitted to read-out transformer 14 with the input of read-out amplifier 13. The corresponding voltage applied is illustrated in FIGURE 3*b*.

As was stated above, the biasing D.C. current in the two branch networks 38 and 39 also defined above, do not influence either transducer 4 as "write back" or transformer 14 with read-out stage 13 as noise or error signal therein. There only remains the residual low ohmic resistance of the conductive transistors 7 to 10 which is negligible, so that actually the coupling of reading-out transducer head 4 and read-out circuit 14–13 is unattenuated.

The invention is not limited to the embodiments described above but all changes and modifications thereof not constituting departures from the spirit and scope of the invention are intended to be covered by the following claims.

I claim:

1. Circuit network for magnetic transducer heads to be used for read-in and read-out, the combination comprising:

an energizing coil for the transducer head;

a read-in transformer having its secondary winding directly connected to said coil;

a read-out transformer having the opposite ends of its primary winding connected to said coil via the emitter-collector paths of transistors, there being two complementary transistors in series between said coil and each end of said primary winding; and means for applying biasing voltages to the base electrodes of all of the transistors for selectively biasing the transistors to cut-off and conduction.

2. In a circuit network for selectively connecting a magnetic transducer head to a read-in and a read-out circuit, the combination comprising: energizing coil means for the transducer having a grounded terminal; a pnp transistor and a npn transistor with the collector of one of the transistors connected to the emitter of the other thereof, the collector of said other transistor being connected to the non-grounded side of said coil means; a read-in transformer having secondary winding means connected to said coil means; a read-out transformer having primary winding means connected between ground and the emitter of said one transistor; and means for biasing the base electrode of said pnp transistor positive and the base electrode of said npn transistor negative during read-in, and vice versa during read-out.

3. In a circuit network for selectively connecting a magnetic transducer head to a read-in and a read-out circuit, the combination comprising: energizing coil means for the transducer head having a grounded terminal; a pnp transistor and a npn transistor with the collector of one of the transistors connected to the emitter of the other thereof, the collector of said other transistor being connected to the non-grounded side of said coil means; a read-in transformer having secondary winding means connected to said coil means; a read-out transformer having primary winding means connected between ground and the emitter of said one transistor; means for preventing D.C. magnetization of said transformer and said coil means; and means for biasing the base electrode of said pnp transistor positive and the base electrode of said npn transistor negative during read-in, and vice versa during read-out.

4. Circuit network for magnetic transducer heads to be used for read-in and read-out, the combination comprising: two series connected, similar coil portions constituting the energizing coil for a transducer head with the junction of the portions being grounded; a read-in transformer having its secondary winding directly connected to said coil; a series circuit network connected across said coil and including two series connected complementary transistors, two series connected primary windings of a read-out transformer with grounded junction, and two further, series connected complementary transistors; and means for selectively biasing the base electrodes of all transistors to cut off during read-in and to conduction during read-out.

5. Circuit network for magnetic transducer heads to be used for read-in and read-out, the combination comprising: two series connected similar coil portions constituting the energizing coil for a transducer head with the junction of the portions being grounded; a read-in transformer having its secondary winding directly connected to said coil; a series circuit network connected across said coil and including two series connected complementary transistors, two series connected primary windings of a read-out transformer with grounded junction, and two further, series connected complementary transistors; first resistive means for connecting the base electrodes of the pnp transistors of said series circuit network to a first terminal; second resistive means for connecting the base electrodes of the npn transistors of said network to a second terminal; and switching means for selectively applying a positive voltage to said first and said second terminal while respectively simultaneously applying selectively negative voltage to said second and said first terminal.

6. An enabling circuit network for magnetic transducer heads, for selective employment thereof as read-in or read-out element, the combination comprising: a transducer head control coil with grounded center tap; a read-in network being directly connected to said control coil; a read-out network symmetrically arranged with respect to ground and having two input branches for variable potentials representing read-out signals; two sets of series connected complementary transistors respectively connecting said branches to the two sides of said transducer coil; and means for selectively base-biasing all transistors to cut off for read-in and to conduction for read-out.

7. An enabling circuit for a magnetic transducer head comprising: two series connected transducer coil portions with grounded junction; a transformer with two series connected primary portions and grounded junction; first and second complementary transistors having their respective collector-emitter paths connected in series, and connecting one transducer coil portion to one transformer primary portion; third and fourth complementary transistors having their respective collector-emitter paths connected in series, and connecting the other transducer coil portion to the other transformer primary portion; first resistive means for connecting the base electrodes of the transistors of one type to a first common terminal; second resistive means for connecting the base electrodes of the transistors of the other type to a second common terminal; and program controlled means for applying a D.C. voltage at alternating and selected polarity across said first and second terminal.

References Cited by the Examiner

UNITED STATES PATENTS 3,115,621 12/63 Slavin ---------------- 340—174.1

IRVING L. SRAGOW, *Primary Examiner.*